United States Patent [19]

Jensen

[11] Patent Number: 4,941,903
[45] Date of Patent: Jul. 17, 1990

[54] NOVEL FIBER-FORMING BUSHING AND TIP PLATE

[75] Inventor: Thomas H. Jensen, Murrysville, Pa.

[73] Assignee: PPG Industries, Inc., Pittsburgh, Pa.

[21] Appl. No.: 357,160

[22] Filed: May 26, 1989

[51] Int. Cl.$^5$ .............................................. C03B 37/08
[52] U.S. Cl. .............................................. 65/1; 65/2; 65/12
[58] Field of Search .................................. 65/1, 2, 12

[56] References Cited

U.S. PATENT DOCUMENTS

| | | | |
|---|---|---|---|
| 2,489,508 | 11/1949 | Stalego | 49/55 |
| 3,311,688 | 3/1967 | Schuller | 65/1 X |
| 3,333,933 | 8/1967 | Mitchell | 65/12 |
| 3,514,841 | 6/1970 | Woodward et al. | 65/1 X |
| 3,574,581 | 4/1971 | Strickland et al. | 65/1 |
| 3,607,185 | 9/1971 | Andrysiak | 65/86 |
| 3,867,119 | 2/1975 | Kasuga et al. | 65/12 |
| 3,979,195 | 9/1976 | Strickland | 65/1 |
| 4,343,635 | 8/1982 | Kim et al. | 65/1 |
| 4,433,991 | 2/1984 | Melan et al. | 65/1 |

FOREIGN PATENT DOCUMENTS 719975 3/1980 U.S.S.R. .................................. 65/1

OTHER PUBLICATIONS

"The Manufacturing Technology of Continuous Glass Fibers", by K. L. Loewenstein, Elsevier Scientific Publishing Company, N.Y., 1973, pp. 61-66; 89-100; 95-97; and 101-106.

Primary Examiner—Robert L. Lindsay
Attorney, Agent, or Firm—Richard E. Maebius

[57] ABSTRACT

This invention relates to a novel bushing apparatus and nozzles or projecting orifices known as tips for the production of glass fibers. Particularly, it relates to a bushing having tips with cross sections in the form of finite-sided polygons. It has been shown that the use of noncircular tips to produce round fibers can result in higher tip packing densities than are now present in the art and that tips with a square cross section represent the most preferred embodiment. Still, more preferred is the embodiment which is the subject of the instant invention wherein rows of tips are interconnected by an integrally formed rib that increases the bending stiffness of the tip plate and its resistance to high temperature thermal creep.

14 Claims, 5 Drawing Sheets

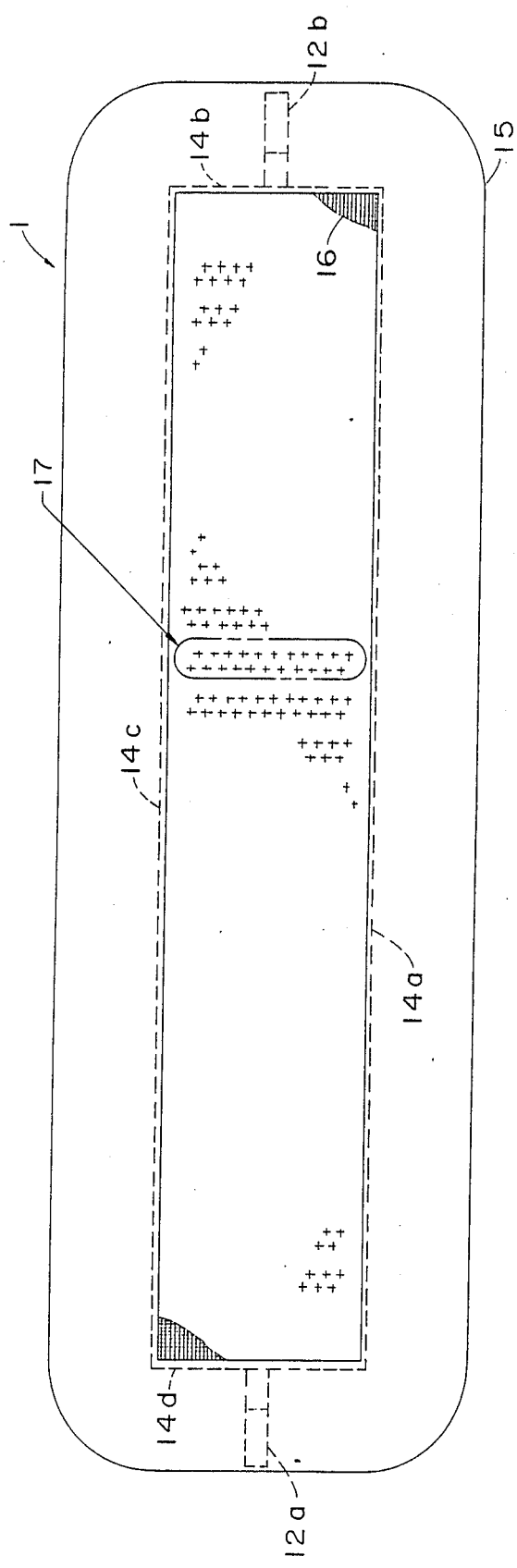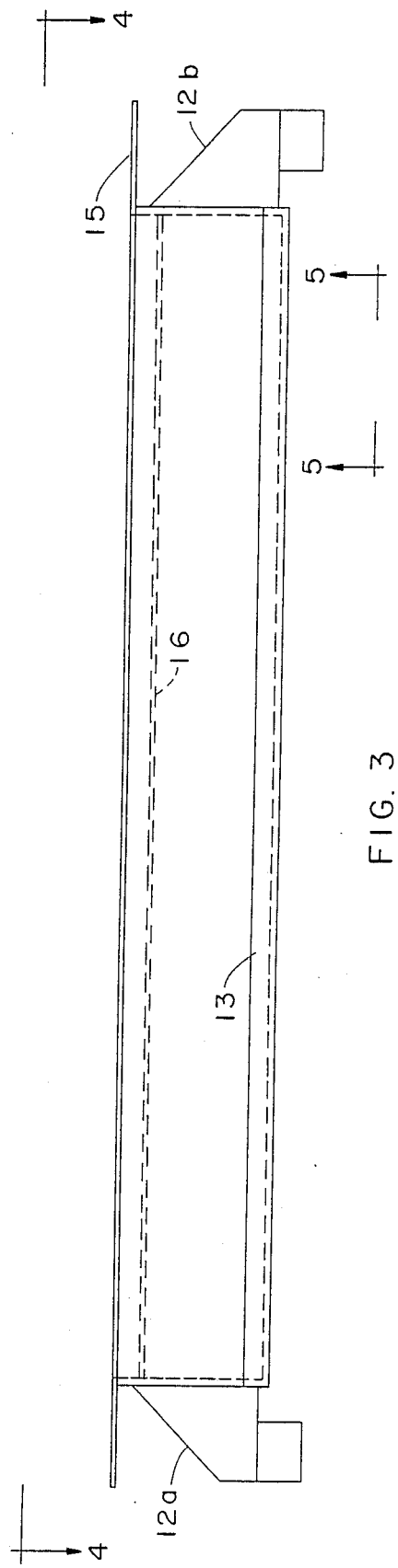
FIG. 4
FIG. 3

NOVEL FIBER-FORMING BUSHING AND TIP PLATE

The present invention relates to a novel bushing and tip plate for the production of glass fibers. More particularly, the invention relates to a bushing apparatus for the production of round glass fibers from a tip plate with rib stiffeners integrally formed and interconnected with the individual tips. Still more particularly, the invention relates to a bushing having square tips interconnected by such a reinforcing rib. The use of noncircular tips, such as square ones to produce round glass fibers is more fully described in my copending application U.S. Ser. No. 07/357,157 filed May 26, 1989 describing a Novel Fiber-Forming Bushing and Tips.

In the forming of glass fibers utilizing modern technology, electrically-heated containers known as bushings, typically constructed of precious metals such as platinum or palladium and alloys thereof are used. Molten glass is fed into the bushing and flows out through a multiplicity of nozzles or projecting orifices (hereinafter referred to as "tips") carried on what is commonly referred to as a "tip plate" which typically forms the bottom of the bushing. The flow of glass through the tips is usually driven by the hydrostatic pressure exerted by the molten glass above the tip plate. In some cases, it may be desirable to pre-pressurize this hydrostatic head by applying a pressurized gas, such as air, above the glass.

Considerable quantities of heat are generated at the surface of a tip plate in a conventional fiber glass bushing. As glass exits the tips, the same mechanisms which cool the glass, i.e., natural convection and enhanced radiative heat transfer due to the presence of fin coolers, will also partially remove some of the heat associated with the tip plate. Nevertheless, the tip plate must still be capable of withstanding temperatures well in excess of 2,000° F. while maintaining its structural integrity. The hydrostatic head mentioned above, which is relied upon to maintain the driving force for the flow of glass through the tips, also exerts a continuous load on the tip plate. At the high temperatures used in forming, this load will eventually lead to thermal creep and can result in a severe sag in the surface of the tip plate. This ultimately limits the useful life of the bushing.

In recent years, the size of production bushings has increased to the point where tip plates carrying as many as 1,200, 1,800 and even 4,000 or more tips are commonplace. Unfortunately, the deformation associated with thermal creep has also become more acute. Grain stabilized platinum alloys have been developed to help resist creep and there are indications that the addition of small amounts of iridium or ruthenium to conventional precious metal alloys may also improve the strength of the tip plate.

Furthermore, since a considerable investment in costly precious metals is required to construct a bushing, it would be advantageous to fabricate as many tips per square inch that can be feasibly accommodated on the tip plate to reduce the quantity of precious metals used while, at the same time, minimizing the problem associated with sag due to creep. The number of tips or orifices per square inch will hereinafter be referred to as the "packing density" of the tip plate.

The prior art teaches one method for lowering the quantity of precious metals used in bushing construction by eliminating the tips entirely and replacing them with a flat perforated plate having a large number of holes or orifices to accommodate the flow of glass. Unfortunately, as the packing density of the orifices increases, both the effective elastic and plastic constants of the plate are reduced so that the same hydrostatic head produces even greater deformation than would be observed in a conventional tip plate of the same size.

Thus, there is a need to reduce the amount of precious metals used in the construction of bushings, especially large bushings having several thousand tips, while minimizing the problems associated with thermal creep. The instant invention addresses this need.

SUMMARY OF THE INVENTION

In accordance with the instant invention, a fiber glass bushing having a plurality of tips interconnected by, and integrally formed with, a plurality of reinforcing ribs is disclosed. The ribs run parallel to the width of the tip plate and structurally incorporate the individual tips thereof, thereby increasing the bending stiffness and resistance to high temperature thermal creep. The tips themselves may be conventional ones having a round cross section or they may be in the form of finite-sided polygons as described in my aforementioned patent application.

Up until now, noncircular tips have been employed only when it was desired to produce fibers having noncircular cross sections. For example, U.S. Pat. No. 4,636,234 discloses a tip plate containing trilobal orifices for the production of similarly shaped fibers. U.S. Pat. Nos. 4,622,054 and 4,759,784 both disclose other shapes and methods of production. These references also teach that in order to accomplish the production of the noncircular fibers, extremely high bushing pre-pressures must be used in order to force the glass through the tips. Also, a rapid quenching of the glass must occur before its surface tension tends to coalesce it into a fiber having a round cross section. Furthermore, while this physical phenomenon has long been known in the art and methods such as those discussed above have been developed to avoid it, it has never been apparent to exploit this behavior to produce round fibers from a noncircular tip. This topic is more fully addressed in my aforementioned copending application. Regardless of the tip geometry used, the instant invention can provide a tip plate of increased strength which resists thermal creep deformation longer than a tip plate having a conventional design.

Therefore, it is an object of this invention to strengthen the tip Plate of a fiber glass bushing in order to resist thermal creep deformation at elevated temperatures.

It is a further object of this invention to increase the packing density of tips present on the tip plate of a fiber glass bushing assembly while maintaining or increasing the structural integrity of the plate.

These and other objects of the invention will become more apparent as the invention is described in detail with reference to the accompanying drawings.

BRIEF DESCRIPTION OF THE DRAWINGS

FIG. 3 is a front elevational view of a typical 800 tip production bushing.

FIG. 4 is a top plan view of the bushing of FIG. 3 taken along line 4—4.

DETAILED DESCRIPTION OF THE INVENTION

Figure 2:
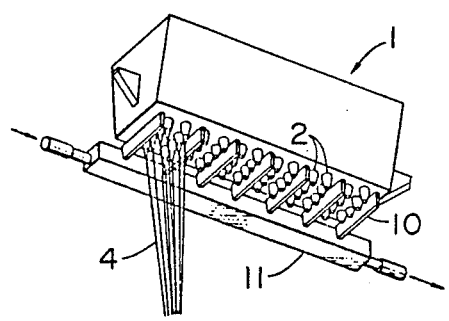
FIG. 2 is a perspective view of a bushing, its associated fin coolers, individual tips and fibers emerging therefrom.
Figure 1:
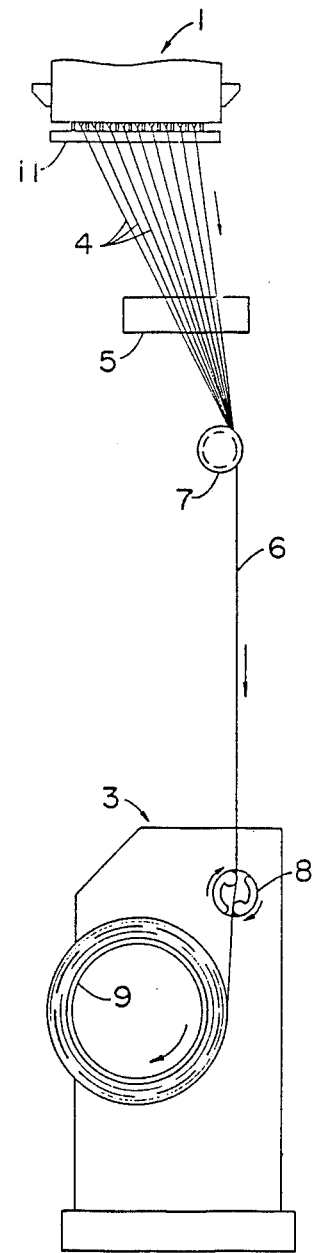
FIG. 1 is a general schematic of a conventional fiber glass forming process showing a bushing, an applicator and a winder.

With reference to the drawings, FIGS. 1 and 2 illustrate a conventional continuous direct draw process for the production of glass fibers wherein molten glass is fed into the top of a bushing assembly (1) and exits from a plurality of tips (2) to form individual glass cones which are then cooled and attenuated by means of a winder (3) into individual glass fibers (4). The individual fibers (4) are brought in contact with an applicator (5) and coated with a chemical size or binder. The fibers (4) are then gathered into a single strand (6) by a gathering shoe (7), normally in the form of a wheel having a grooved rim. The strand (6) is then wound over a rotating spiral (8) and onto a cardboard forming tube (9) which is rotated by an appropriately powered winder (3). The winder may cause either the forming tube (9), spiral (8) or both to reciprocate back and forth along their axis of rotation so that the strand (6) passing over the spiral (8) is laid down along the length of the forming tube (9). Cooling fins (10) are inserted between adjacent rows of tips (2) with one end of each fin being attached to a manifold (11) through which a cooling fluid, such as water, is pumped. The fins (10) are positioned so as to absorb radiative heat from the individual glass cones and conduct it to the manifold (11) where it is removed by the cooling fluid. The fins also remove some heat radiated by the tip plate (13).

FIGS. 3 and 4 present an elevational and top plan view respectively of a typical bushing (1). The top of the bushing (1) is brought in contact with a glass supply source. The supply source may be the forehearth of a direct melt furnace in which glass flows directly along the length of the forehearth and into the bushing. Examples are disclosed in the book entitled, "The Manufacturing Technology of Continuous Glass Fibers", by K. L. Lowenstein, published by the Elsevier Publishing Company, New York, 1973, at pages 61–66, where a typical fiber glass direct melt forehearth system is shown with several configurations of forehearths and bushings attached thereto. Specifically at page 66, the author shows the attachment of a bushing to a typical forehearth. In the same book at pages 89–100, typical fiber glass bushings and their relation to the fiber drawing process are described. An alternative supply system, which may also be used, is one in which glass is supplied in the form of solid marbles to a special bushing. The marbles are then melted directly inside the bushing and the resulting glass fed through a plurality of tips located on its bottom. A bushing of this type is also shown in Lowenstein, supra, at pages 102–104.

Two ears or terminals (12a and 12b) are provided for passing an electrical current through the bushing assembly (1) in order to heat it and the tip plate (13). The bushing has four sidewalls (14a, b, c and d) suspended from a flange (15) and attached to the tip plate (13) at their other extremity typically by welding. The bushing (1) also has an open top so that the sidewalls and tip plate form a cavity to accommodate molten glass flowing from the forehearth or the upper part of a marble melt bushing as described above. A screen (16) may also be provided in order to prevent any small particulate debris carried in the glass from reaching the tip plate (13) although bushings without screens may also be used.

The tip plate (13) carries a plurality of tips (2) arranged in groups (17) of at least two rows parallel to each other and the minor axis of the tip plate. These groups (17) are usually separated by a space wide enough to accommodate the insertion of an individual fin (10) carried by the manifold (11). (Both the fins (10) and their associated manifold (11) are collectively referred to as "fin coolers" by those skilled in the art.)

Bushings, as previously described, are constructed from precious metals such as platinum, rhodium, palladium, and alloys thereof. A typical alloy that has been widely used contains approximately 80 percent platinum and 20 percent rhodium on a weight basis. Sometimes, grain stabilized platinum and grain stabilized platinum alloys have been employed where strength and creep resistance are a primary design criteria. Other alloys have included platinum and platinum-rhodium alloys containing small amounts of iridium or ruthenium to also increase strength. Gold has also been used occasionally to locally alter the wetting characteristics of the glass.

In the manufacture of a conventional tip plate, a sheet of suitable precious metal alloy, along with a die, are first put through an appropriate rolling mill. As the sheet is compressed, the die produces a sequence of indentations at each location where a tip is to be formed. In the next step, a hydraulic punch press and a female die are used to push a series of pins through the tip plate material and into the female die. The metal alloy is plastically deformed and flows into the gap between the pins and the die whereby the walls of the tip (2) and its base shoulder or fillet (20) are formed. This cold drawing or coining process is more fully described by Lowenstein, supra, at pages 95–97.

In the case of the instant invention, reinforcing ribs are formed during the initial rolling operation described above. The only difference is that the rolling die is modified so that the rib will be formed at the same time the indentations used to locate the tips are made. The remainder of the operation is the same with the exception that the female die used in the punch press operation is modified to accommodate the raised ribs of the tip plate.

Figure 5:
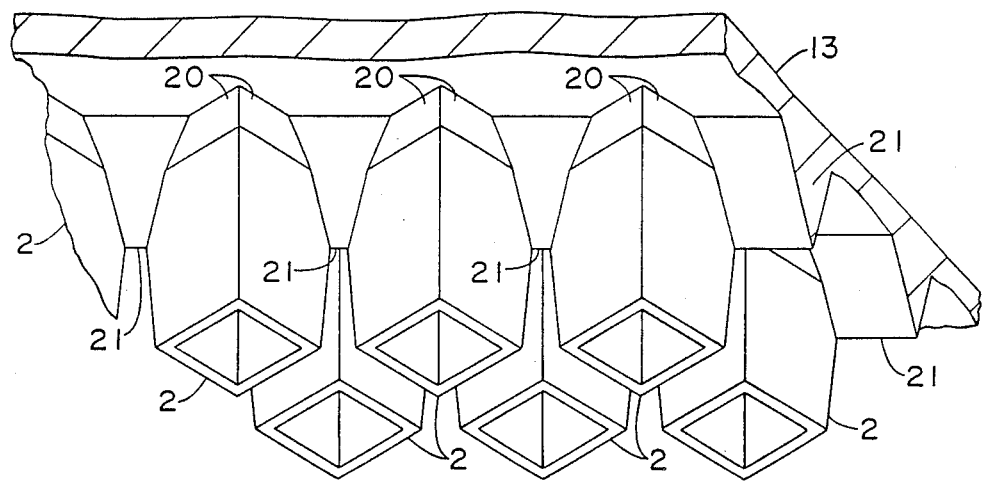
FIG. 5 is an enlarged perspective view of a section of the tip plate of FIG. 3 taken along line 9—9 showing square tips reinforced with an integrally formed rib.
Figure 9:
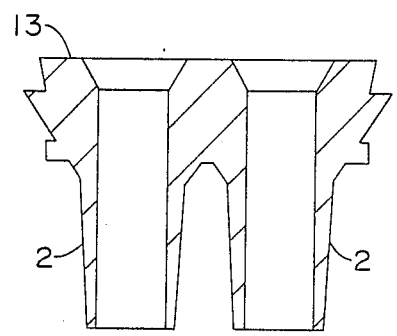
FIG. 9 is a cross sectional view of two tips taken along line 9—9 of FIG. 6.
Figure 10A:
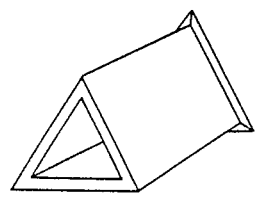
FIG. 10 is a perspective view of various noncircular tips which can be used in conjunction with the rib reinforced tip plate which is the subject of the instant invention.
Figure 10B:
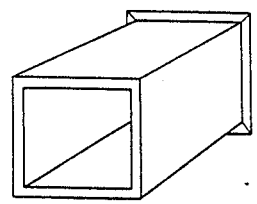
Figure 10C:
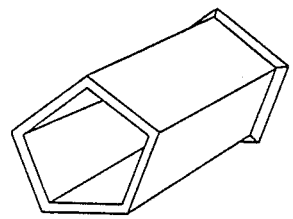
Figure 10D:
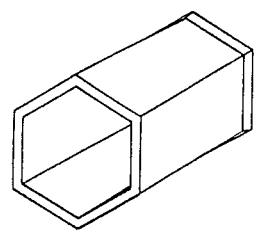
Figure 10E:
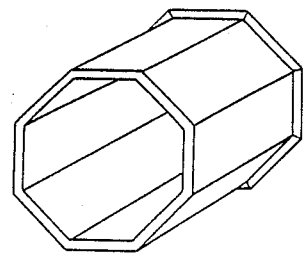

The rib (21) is preferably triangular in its cross section as illustrated in FIGS. 5 and 9 although other cross sections are possible. The base of the rib is generally slightly less than the widest dimension of the shoulder (20) of the tip but may also be slightly greater depending upon the actual dimensions of the dies used in the manufacturing process. The height of the rib extends from the surface of the tip plate anywhere up to a distance slightly below the tip exit.

FIG. 5 better illustrates the relationship of the tips (2) and the rib structure (21) by providing a perspective view of them as they would be seen from below the tip plate, generally looking into line 5—5 of FIG. 3.

In the practice of the instant invention, the use of a square tip is the most preferred embodiment although conventional round tips may also be used as well. The reasons for this preference are more fully described in my aforementioned copending application.

Figure 6:
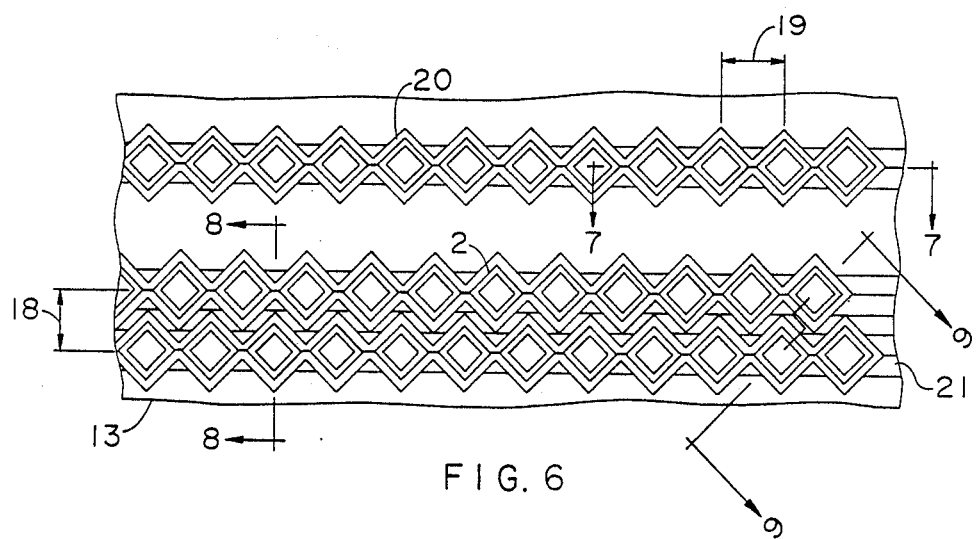
FIG. 6 is a bottom plan view of a tip plate having rib stiffeners and square tips arranged in their most preferred orientation.

FIG. 6 is a bottom plan view of a tip plate having square tips arranged in their most preferred orientation along with the rib (21) structure described above. The tips are oriented in such a fashion that their diagonals lie parallel to the major and minor axis of the tip plate (13) and tips in adjacent rows are staggered with respect to one another. This arrangement minimizes the pitch (18) between adjacent rows as well as the pitch (19) between adjacent tips in the same row.

Figure 7:
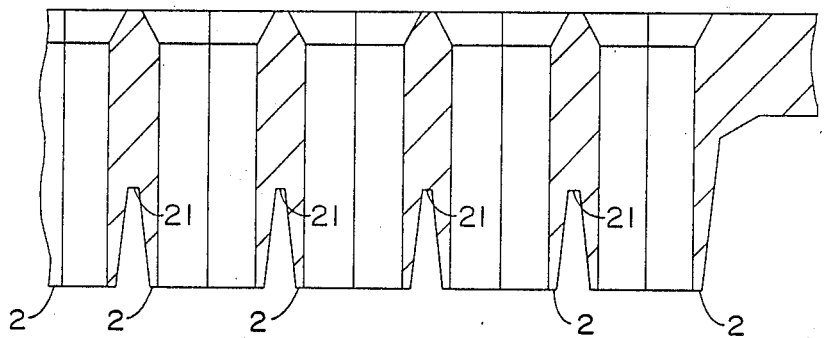
FIG. 7 is a cross sectional view of adjacent tips taken along line 7—7 of FIG. 6.

FIG. 7 presents a cross sectional view of two tips adjacent to one another in the same row as taken along line 7—7 of FIG. 6. As mentioned previously, a shoulder (20) near the base of each tip (2) usually results from the cold drawing process used to form the tip.

Figure 8:
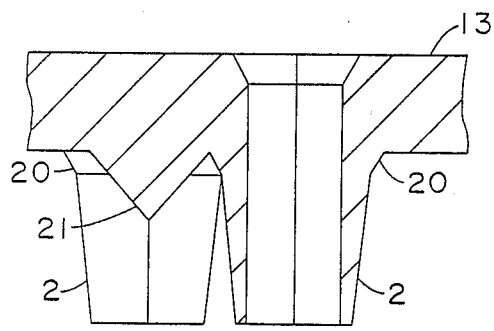
FIG. 8 is a cross sectional view of the tips taken along line 8—8 of FIG. 6.

FIG. 8 presents a cross sectional view of two tips taken along line 8—8 in FIG. 6. Here, the effect of the rib (21) is more clearly visible. Although the rib increases the bending moment of inertia and stiffness of the tip plate, it also allows the bending stresses to be more evenly distributed over a greater cross sectional area thereby resulting in a lower stress intensity and creep rate than would otherwise be present.

With reference to FIG. 10, some individual noncircular tips (2) which can be formed on the tip plate (13) to allow the production of round glass fibers also utilizing the rib structure instant invention are shown in perspective. For example, an equilateral triangle (10a), a square (10b), a pentagon (10c), a hexagon (10d), and an octagon (10e) are all forms of regular polygons having sides of equal length. It is a property of regular polygons that they may be circumscribed by a circle that touches each vertex of the polygon. Although regular polygons are preferred, this does not mean that this invention neglects to contemplate the use of irregular polygonal shapes as well. For example, a tip having a cross section in the shape of a right triangle is envisioned as well as an equilateral one. A tip having four sides of equal or unequal length and formed in the shape of a parallelogram or rhombus, as well as a square tip, is similarly contemplated.

Noncircular tips of the type described herein can be used to produce round fibers because near the tip exit, where the emerging glass has a very low viscosity, the surface tension will constrict the surface of the glass and cause it to assume a circular cross section even though the glass initially issues with substantially the same cross section as the tip. These surface tension forces may be so strong as to actually cause glass issued at a very high temperature to coalesce into beads or droplets rather than flow in a continuous stream. At lower temperatures, the behavior of the stream is largely dominated by the increased viscosity so that surface tension effects are insignificant by comparison. This is the reason it is necessary to rapidly quench glass issuing from a noncircular tip to "freeze" its shape by rapidly increasing the viscosity before the surface tension has time to coalesce it when the production of a noncircular fiber is desired.

It is also believed that the use of noncircular tips helps to benefit the stability of the forming process and may reduce the frequency of breakouts as well. In the immediate vicinity of the tip, the irregular surface of the stream as it exits into the surrounding atmosphere will provide an enhanced but localized area for convective and radiative heat transfer that would not be present if the cross section of the stream were circular. This localized cooling results in stringers or ribbons of glass having a slightly higher viscosity than the rest of the stream. It is believed that this effect helps stabilize the cone and formation of the fiber while the stream is coalesced by the surface tension.

The use of a noncircular tip in the form of substantially regular finite-sided polygon or irregular variations thereof also results in increasing the packing density of the tips and thus better utilizing the available surface area of the tip plate while an integrally formed rib structure as described herein increases the bending stiffness of the tip plate and thereby reduces the effect of thermal creep deformation.

While this invention has been described with reference to certain details of construction and embodiments illustrated in the accompanying drawings and specification, it is not intended that it be limited except insofar as what appears in the accompanying claims.

I claim:

1. In a bushing for the production of round glass fibers, said bushing having sidewalls, an open top, and a bottom tip plate, the improvement comprising: a plurality of integrally formed, raised ribs of a substantially solid triangular cross section crossing the width of said tip plate, the ribs further having a plurality of separate hollow tips integrally formed therein to accommodate the flow of molten glass, the ribs and tips being substantially parallel to one another, both the tips and ribs projecting downwardly from the tip plate in the direction of the flow of glass, each tip having a substantially constant wall thickness, the bottom edge of each tip being substantially parallel to the plane of the tip plate.

2. The bushing of claim 1 wherein the cross section of each tip is a finite-sided polygon.

3. The bushing of claim 1 wherein the cross section of each tip is a regular polygon having between three and eight sides.

4. The bushing of claim 1 wherein the cross section of each tip is an irregular polygon having between three and eight sides.

5. The bushing of claim 1 wherein the cross section of each tip has four sides, each tip further being oriented in such a fashion that its diagonals lie parallel to the major and minor axis of the bushing with tips in adjacent rows being staggered with respect to one another.

6. The bushing assembly of claim 1 wherein the cross section of each tip is substantially square, each tip further being oriented in such a fashion that its diagonals lie parallel to the major and minor axis of the bushing with tips in adjacent rows being staggered with respect to one another.

7. The bushing of claim 1 wherein the cross section of each tip is round.

8. In a bushing for the production of round glass fibers, said bushing having sidewalls, an open top, and a bottom tip plate, the improvement comprising: a plurality of integrally formed, raised ribs of a substantially solid triangular cross section crossing the width of said tip plate, the ribs further having a plurality of separate hollow tips integrally formed therein to accommodate the flow of molten glass, the ribs and tips being substantially parallel to one another, both the tips and ribs projecting downwardly from the tip plate in the direction of the flow of glass, each tip having tapered walls of decreasing thickness along the direction of flow, the bottom edge of each tip being substantially parallel to the plane of the tip plate.

9. The bushing of claim 8 wherein the cross section of each tip is a finite-sided polygon.

10. The bushing of claim 8 wherein the cross section of each tip is a regular polygon having between three and eight sides.

11. The bushing of claim 8 wherein the cross section of each tip is an irregular polygon having between three and eight sides.

12. The bushing of claim 8 wherein the cross section of each tip has four sides, each tip further being oriented in such a fashion that its diagonals lie parallel to the major and minor axis of the bushing with tips in adjacent rows being staggered with respect to one another.

13. The bushing of claim 8 wherein the cross section of each tip is square, each tip further being oriented in such a fashion that its diagonals lie parallel to the major and minor axis of the bushing with tips in adjacent rows being staggered with respect to one another.

14. The bushing of claim 8 wherein the cross section of each tip is round.

* * * * *